US006972868B1

(12) United States Patent
Gondek et al.

(10) Patent No.: US 6,972,868 B1
(45) Date of Patent: Dec. 6, 2005

(54) IMAGE DATA COMPRESSION METHOD

(75) Inventors: Jay S. Gondek, Camas, WA (US);
Ranjit Bhaskar, Portland, OR (US);
Steven O. Miller, Vancouver, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1026 days.

(21) Appl. No.: 09/710,810

(22) Filed: Nov. 9, 2000

(51) Int. Cl.$^7$ ............................ G06F 15/00; G06K 9/46
(52) U.S. Cl. ...................................... 358/1.9; 382/232
(58) Field of Search .............................. 358/1.15, 5 W, 358/1.9; 375/240.14; 382/166, 232, 235, 382/238, 247, 162, 164

(56) References Cited

U.S. PATENT DOCUMENTS

| | | | |
|---|---|---|---|
| 5,046,119 A | | 9/1991 | Hoffert et al. |
| 5,377,018 A | | 12/1994 | Rafferty |
| 5,392,072 A | | 2/1995 | Rodriguez et al. |
| 5,483,622 A | | 1/1996 | Zimmerman et al. |
| 5,490,237 A | | 2/1996 | Zimmerman et al. |
| 5,576,767 A | * | 11/1996 | Lee et al. ............... 375/240.14 |
| 5,585,944 A | * | 12/1996 | Rodriguez ................... 358/500 |
| 6,356,657 B1 | * | 3/2002 | Takaoka et al. ............. 382/197 |

FOREIGN PATENT DOCUMENTS

| | | |
|---|---|---|
| EP | 0149124 | 7/1985 |
| EP | 0286286 | 10/1988 |
| EP | 0378762 | 7/1990 |
| EP | 0570083 | 11/1993 |
| EP | 0681266 | 11/1995 |
| EP | 0703549 | 3/1996 |
| EP | 0725485 | 8/1996 |
| EP | 0935216 | 8/1999 |
| WO | WO 01/35673 | 5/2001 |

OTHER PUBLICATIONS

J. McKenny, "An Alternate T PostScript Increases Graphics Throughput", Nov. 1989, pp. 97-100.
J. Schonhut, et al., "Constructive Page Description", Mar. 1991, pp. 71-78.
The Hardcopy Observer, "Technology Tutorial, Introduction to Printer Hardware", 1992, pp. 137-162.
R. Nass, "Laser-Printer Controller Eases Memory Demands", Oct. 25, 1994, pp. 139-140.
Hewlett-Packard Company U.S. Appl. No. 09/192,912, filed Nov. 16, 1998, entitled: Compound Document Page Data Processing.
Hewlett-Packard Company U.S. Appl. No. 09/193,321, filed Nov. 16, 1998, entitled: Compound Document Page Data Compression.
British Search Report dated May 7, 2002.

* cited by examiner

Primary Examiner—Kimberly Williams
Assistant Examiner—Charlotte M. Baker

(57) ABSTRACT

A method of compressing a set of image data organized into a matrix of pixels includes selecting a multi-pixel block portion of the data, then performing a mathematical function on the multi-pixel block portion to generate a first result. The multi-pixel block portion is divided into at least two segments, and a function is performed on each of the segments to generate a second result and a third result. Based on a comparison of the first, second, and third results, determining whether or not to compress the multi-pixel block portion. The function may be a deviation or mean measurement and serve to determine the noise level and image detail level to determine whether to compress or divide the block into sub blocks. Sub blocks may be recursively analyzed for compression or subdivision until all sub blocks are compressed or divided into single pixels.

18 Claims, 4 Drawing Sheets

FIG. 3

|   | A | B | C | D | E | F | G | H |
|---|---|---|---|---|---|---|---|---|
| 8 | 1 |   |   |   | 1 |   | 1 |   |
| 7 |   | 1 |   | 1 |   |   |   | 1 |
| 6 |   |   |   |   |   | 1 | 2 | 2 |
| 5 | 1 |   | 1 |   | 1 | 2 | 3 | 3 |
| 4 |   |   |   | 1 | 3 | 3 | 3 | 2 |
| 3 | 1 |   | 1 | 2 | 3 | 3 | 2 | 1 |
| 2 |   | 1 | 2 | 3 | 3 | 2 | 1 |   |
| 1 | 1 | 1 | 2 | 3 | 2 | 1 |   | 1 |

IMAGE DATA COMPRESSION METHOD

FIELD OF THE INVENTION

This invention relates to data compression, and more particularly to compression of image data transmitted to printers.

BACKGROUND AND SUMMARY OF THE INVENTION

Image compression is needed to reduce the data transmission rate for high resolution images. When transmitting a large full color (24-bit per pixel) image to a printer, bandwidth limitations may limit printing rate, even when a printer is capable of printing at a faster rate. As wireless communications with computer peripherals becomes more prevalent, bandwidth limitations may remain critical even as processor speeds increase. Accordingly, computers have engaged in compression of image data before transmission to the printer. Compression may generate significant file size reductions, but with a trade-off of image quality. Existing image compression algorithms such as JPEG suffer particularly strong tradeoffs when compressing printing images including text, because it is a frequency based compression technique.

Existing printers limit the disadvantages of this by permitting the user to select different print quality modes. For higher quality modes, printers (such as thermal ink jet printers) normally take longer to print an image, even without transmission bottlenecks, because more layers of ink are applied, and images may be printed in higher resolutions. For high quality printing, longer file transmission times are tolerable, as long as they do not exceed the actual printing time. Thus, less compressive algorithms that do not significantly degrade image quality may be employed without disadvantage.

In such existing printers, users may select lower quality printing modes for faster output when image quality is not critical, such as for document drafts. In such cases, higher compression ratios are needed to transmit an image within the reduced printing time. The image degradation that comes with higher compression is generally tolerated for such draft printing needs.

However, printers have been proposed which set printing mode automatically, such as based on the type of media employed (e.g. faster draft mode for basic paper, slower photo-quality for special coated papers.) In such printers, it may not be practical for the printer to communicate this print mode back to the computer for processing the data differently depending on print mode, and a superior compression mode that provides efficient compression with limited degradation is needed.

The present invention overcomes the limitations of the prior art by providing a method of compressing a set of image data organized into a matrix of pixels includes selecting a multi-pixel block portion of the data, then performing a mathematical function on the multi-pixel block portion to generate a first result. The multi-pixel block portion is divided into at least two segments, and a function is performed on each of the segments to generate a second result and a third result. Based on a comparison of the first, second, and third results, determining whether or not to compress the multi-pixel block portion. The function may be a deviation or mean measurement and serve to determine the noise level and image detail level to determine whether to compress or divide the block into sub blocks. Sub blocks may be recursively analyzed for compression or subdivision until all sub blocks are compressed or divided into single pixels.

BRIEF DESCRIPTION OF THE DRAWINGS

FIG. 3 is a representation of an original image data block portion.

FIG. 6 is a representation of a compressed image data block portion.

DETAILED DESCRIPTION OF A PREFERRED EMBODIMENT

Figure 1:
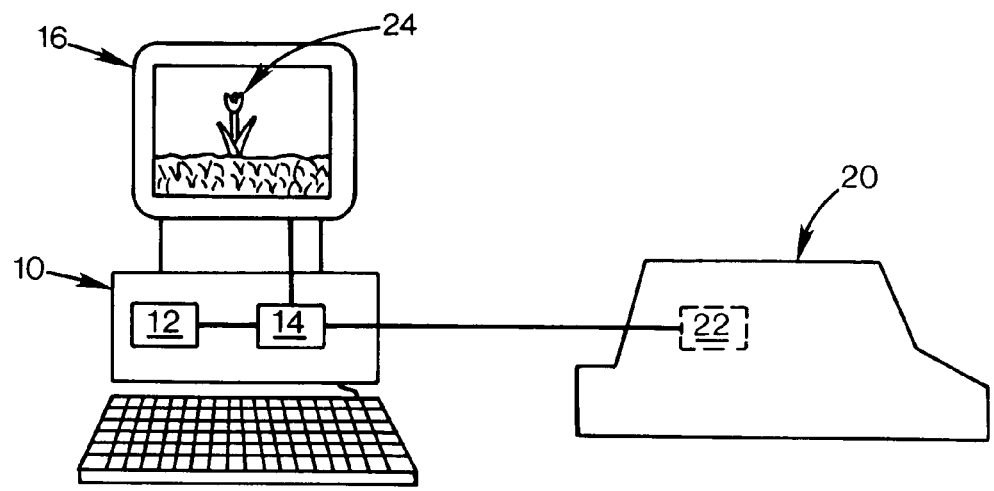
FIG. 1 is a simplified block diagram of a computer and printer system operating according to a preferred embodiment of the invention.
Figure 2:
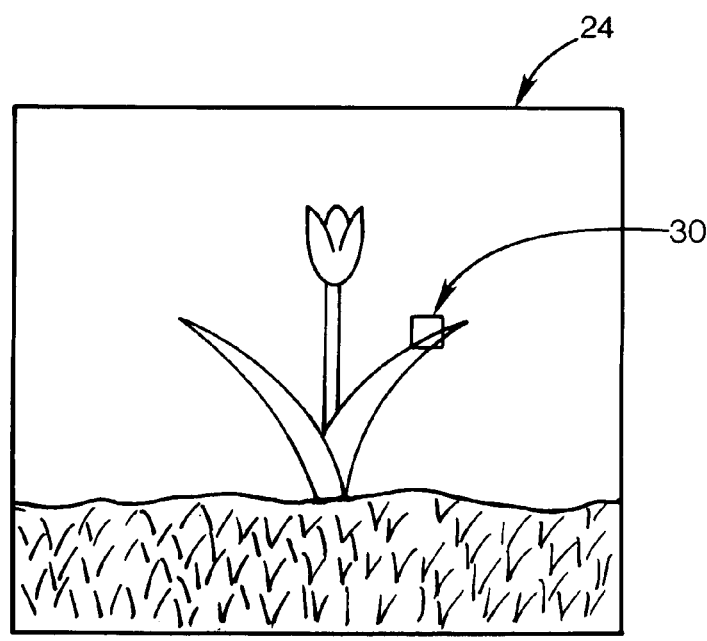
FIG. 2 is an image for processing operating according to a preferred embodiment of the invention.

FIG. 1 shows a computer 10 having a memory device 12, a computer processor 14, a connected monitor 16, and a connected printer 20 having a printer processor 22. As shown in FIG. 2, a raw, uncompressed graphic image 24 is displayed on the monitor in the form of a matrix of a multitude of pixels, each having a color or brightness value. The image file corresponds to a computer data file that represents the image in numeric form, with each pixel represented by a 24-bit word corresponding to the color and brightness characteristics of the pixel. The data file is stored in the computer memory.

Figure 4:
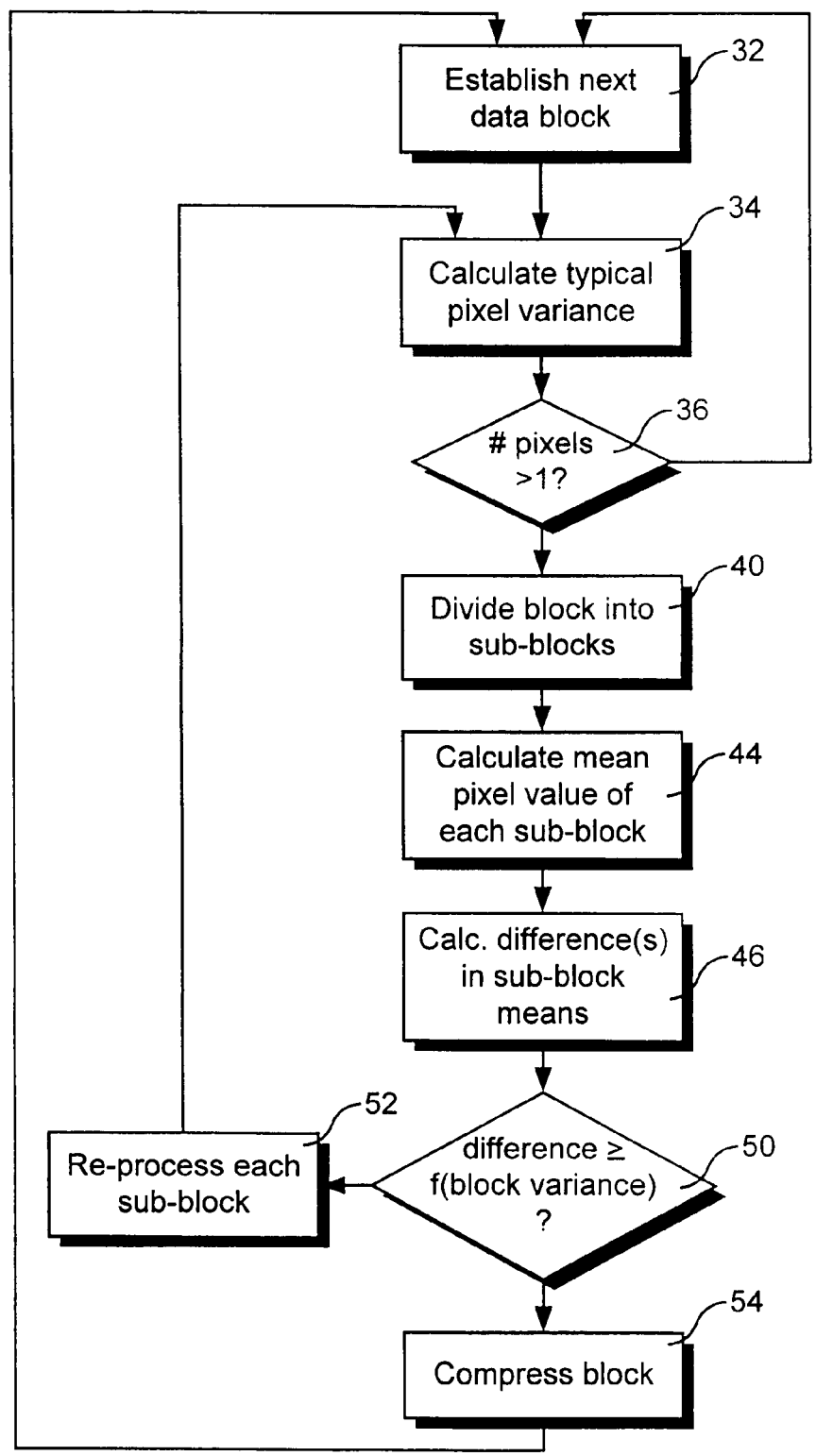
FIG. 4 is a flow chart illustrating the preferred embodiment of the invention.

A representative block 30 of the data is shown in FIG. 3. The data block is an eight-by-eight pixel matrix, and the pixel values are simplified for the illustration, with four different pixel values being possible: blank (0), "1", "2", and "3". When a user desires to print the image file, the computer processor processes the data file by the method shown in FIG. 4 to compress it prior to transmitting it to the printer.

The compression process occurs in the computer processor, as it sequentially analyzes and compresses each block of the data file. In step 32, the processor acquires the next data block, the first data block of the image if a new file is being processed, or the subsequent block if the image is in the midst of compressing the image. As will be discussed below, the next block may be a sub-block of a block under processing, after a first sub block has been processed.

In step 34 the processor calculates the typical pixel variance for the block. This typical variance or deviation may also be described as the mean absolute deviation. This calculation may be any of a range of known methods of calculating the variability in a data set, such as standard deviation, root-mean-squared technique. In the preferred embodiment, a simple calculation of the average of the absolute values of the differences between each pixel value and the average pixel value. In the illustrated block of FIG. 3, with 24 blanks, 20 ones, 10 twos, and 10 threes, the block average is 70/64=1.09. Each of the 24 zeros differs from this by an absolute amount of 1.09, each "one" by 0.09, each two by 0.81, each three by 1.81, for a typical deviation of $[(24*1.09)+(20*0.09)+(10*0.81)+(10*1.81)]/64=0.85$.

In step 36, a determination is made whether there is more than one pixel in the block. Clearly, when an 8-by-8 pixel block is used as shown, initially the answer will be yes, and the process proceeds. If the answer is no, as will be discussed below with respect to later recursions or cycles of the process, the process returns to analysis of the next block, either of new data from a new block, or of data of a sub-portion of a block for which the process is not yet complete.

In step 40, the block being processed is divided into sub-blocks. Preferably, this is by dividing a square block in half on an orthogonal mid line in an arbitrary direction. A rectangular block having an aspect ratio of 2 is preferably divided in half across its long axis, to yield two squares. A rectangular block with an aspect ratio of 2 may also be divided across its short axis, yielding 2 blocks of ratio 4. In alternative embodiments, the block may be divided into more than two pieces, or into shapes other than squares and rectangles. In a non-orthogonal arrangement of data, other suitable shapes may be employed, with the desire that each block is divided in a manner that provides two sub-blocks of minimal periphery and minimal center-to center distance, for maximal apparent visual adjacency and compactness. If possible, several ways of dividing the block are tested (usually 2, a horizontal or vertical cut). If either cut meets the criteria for subdivision, the block is subdivided that way. If the block is to be divided, the cut that minimizes the deviation in each sub cell is preferred. This way, if there is an edge or gradient, the cut will happen in the correct direction to maximize block size and visual quality.

In step 44, the mean pixel value is calculated for each sub-block. In step 46, the absolute difference between the sub-block mean values is calculated. In step 50, a function is applied to the total block variance and sub-block means to establish a threshold amount, and the total block variance is compared to the result of the function. If the variance exceeds the threshold, then it is concluded that the variance of the block is due to an image "signal" or desired detail, and not to noise that is distributed throughout the block, and the process is directed to step 52, in which each sub block is processed by returning to step 34 (one being stored for subsequent processing until after the first sub block is fully processed, including the recursive processing of sub blocks of the sub block.)

If the difference between the sub block deviations is less than the threshold, the block is considered to be compressible without loss of important visual information. To compress a block (step 54), the block is represented by a single value which is the average of the pixels in that block, so that when the block is decompressed, each pixel location that was part of the original compressed block is assigned the same identical single value. The only information required to be transmitted in a compressed data stream is the single value, plus an identifier of which pixel locations are included in the block. Alternatively, compression algorithms such as run-length delta-row etc. can be used to compactly compress the processed image. For image files using 24-bit words per pixel, the block location information is minimal compared to the color value data, and the compression ratio (uncompressed size divided by compressed size) of a block is essentially equal to the number of pixels in the block.

Figure 5:
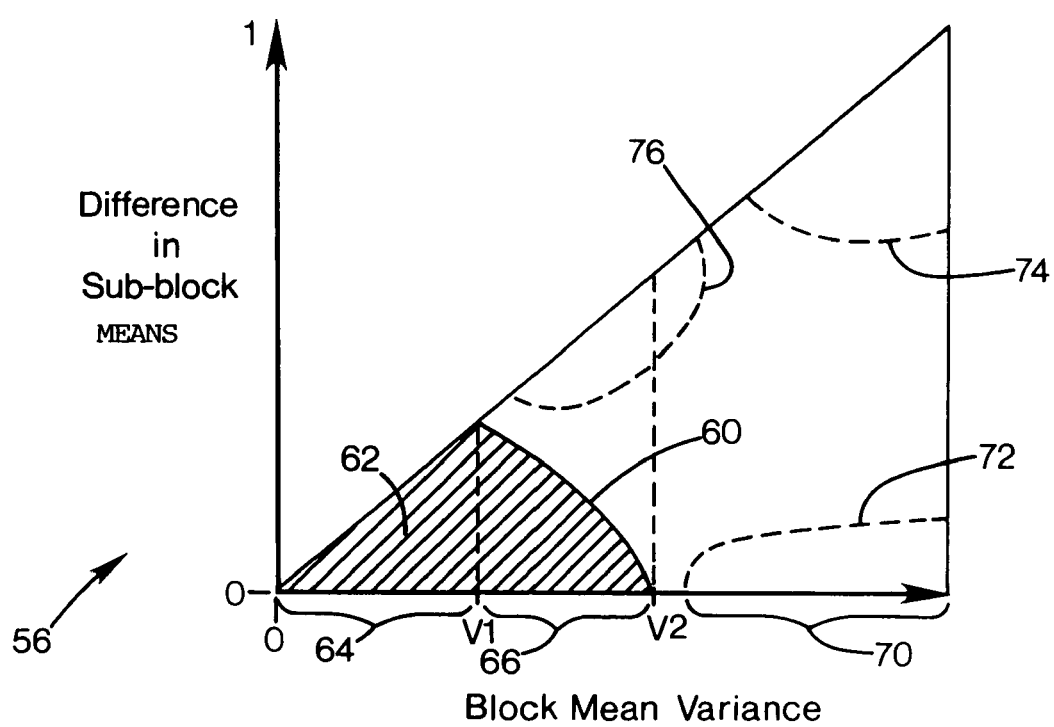
FIG. 5 is a graph illustrating an exemplary function according to which a preferred embodiment of the invention operates.

FIG. 5 shows a graphical illustration of the function of step 50 in a graph 56. The X-axis corresponds to the block mean variance, and the Y-axis corresponds to the absolute value of the difference in mean values for the sub-blocks. Both axes are normalized for a scale of zero to one. A threshold line 60 represents the threshold below which the block is compressed, with the area under and to the left of the threshold line being shaded to represent a compression zone 62.

There are three ranges along the block mean variance axis. First, from zero to V1 is a low variance range 64 in which the block is compressed, regardless of the difference between the sub blocks. In the limiting case, denoted along the diagonal line at the upper limit of range 64, the sub blocks are each perfectly uniform, but slightly different from each other in value. Such variation is likely not due to noise, but is so small that it does not contribute to the image quality, and may be compressed away. In the limiting case at the lower limit, along the Y axis, there is no difference between the blocks, but at least some small variations in the data found equally in the blocks. At levels below V1, this is presumed to be noise of no importance to the image. At the origin of the graph, the entire block is perfectly uniform.

In an intermediate block variance range 66 between V1 and V2, whether or not a block is compressed or divided into sub-blocks for separate analysis depends on the block variance, and the difference between the sub block averages. At the limit V1, the block will be compressed even if there are maximum differences between the sub blocks. However, as the block variances increases, high values of sub block differences are considered unsuitable for compression. As block variance increases, the tolerated sub block difference drops, reaching zero at the upper limit of range 66, at point V2. At and above this amount of block variance (from V2 and up, over range 70), even identically variant sub-blocks are not compressed.

In the preferred embodiment, the function establishing the threshold for compression in the intermediate range 66 is a straight line function. In alternative embodiment, other functions having the same limits may be used. The values of V1 and V2 depend on the application, and may be established based on the relative need for image quality versus compression level, and based on knowledge of the typical noise characteristics of the device used to generate the image. For instance, a CCD used in a digital camera or scanner may have a particular noise characteristic that can be established, to filter most noise, with minimal image detail filtering, and limiting filtering to regions where image detail would not be lost. Essentially, the noise is tolerable in detailed portions of the image, which are left alone to preserve apparent detail, while noise is eliminated from areas lacking detail. While not primarily intended to improve image quality by reducing noise, the disclosed compression method may be used beneficially for that purpose.

The values of V1 and V2 are dependent on the resolution of the source image relative to the viewing distance, and the values at V1 and V2 may vary at run-time depending on the scale of the examined block. In the preferred embodiment, V1 and V2 are multiplied by a value greater than 1.0 (preferably at least in the range of 1.5 to 2.0) each time the scale of the examined block is reduced. This helps to account for the fact that as the spatial frequency of detail increases, a viewer is less visually sensitive to changes or averaging of the data. There are many other functions that may relate V1 and V2 both to the scale of the data, and to the reduction in block-size during the algorithm execution, we use a simple one.

The graph of FIG. 5 is also explained by indicating what image portion types fall in various areas of the graph. As it is impossible for there to be a greater difference in sub block averages than in the variance of the block overall, the upper left triangular half of the graph is empty. As noted, a uniform block is located at the origin. Image noise is found at low levels of sub block difference, at block variance less than V2. At higher variances, low difference values such as in zone 72 reflect high image detail over an area, such as high contrast fine-grained textures that are in the image (e.g. sharply focused grass or sand). The highest values of sub block difference (with the inherent high value of block variance) are generated in zone 74 by edges in the image, sharp transitions from one value to another. At the limit, the maximum value on each axis is provided in a case in which each sub block is uniform, but of an opposite value, with an abrupt transition from black to white aligned coincidentally with the boundary between the sub-blocks. A ramp or gradient region 76 is found at high difference values, and intermediate block variance values. Ramps include relatively smooth transitions of value across a block, from one sub block to the other. A block with a transition that runs parallel to the sub-block boundary would be located on the Y Axis, as there would be no difference between sub blocks.

FIG. 6 shows the block data of FIG. 3 after compression. The pixels are identified A1, A2, ... G8, H8 and sub blocks are identified by the range of pixels (A1–D4, 5A–D8, E7–F8); the total block is identified A1–H8. This illustration proceeds with qualitative assessments of the step 50 threshold decision for brevity and clarity. The block has been acquired by the processor at step 32, and the calculation of the block variance made as noted above. The block is first divided in half into sub blocks 82 (A1–D8) and 84 (E1–H8). The choice to divide the square block vertically is arbitrary. All square sub blocks may consistently be divided vertically, or the choice may be alternated or randomized to avoid developing patterns or artifacts in which all rectangular compressed blocks are commonly oriented. Alternatively, multiple division methods may be performed on single blocks and sub-blocks to optimize compression, as will be discussed below. Preferably, two divisions are tested, and the division that yields the largest difference in means is the one used (if the block is divided at all). The use of the difference in means is a particular example of computing the gradient across the block with some other kernel. It is convenient to use the means because if subdivision occurs, the mean is useful to compute the pixel variance of the sub-block.

The mean for each sub block is calculated. (This step may be omitted in cases where the block variance is above threshold V2, or below V1, where compression always occurs) to reduce calculations. A decision step would immediately follow step 40 and proceed directly to step 52, bypassing sub block calculations.) In this instance, the block variance is high, due to the significant range of values. The difference between the sub-block means is also quite high, with block 82 appearing to have a significantly lower variance than block 84, suggesting that the block would fall toward the upper right of the graph, well away from the domain suggesting compression.

Accordingly, each sub block is processed. Sub-block A1–D4 is set aside, and sub-block A5–D8 is processed. Qualitatively, it appears to be a block with no image information, and low level noise. The block variance is low, and the difference between sub block means is low. The sub block is therefore compressed, so that it is represented by the single value of zero, which most closely approximates the average value of all pixels. This value and location information is buffered for transmission to the printer.

Sub-block A1–D4 is retrieved from temporary storage, and processed as a block. Qualitatively, it appears to be a gradient between low values on the left, and high values on the right. A relatively high block variance, but possibly below V2, suggesting that whether it is compressed or divided may depend on its sub block mean differences. That calculation yields a large difference between the relatively low value left sub-block, and the higher-mean right half. Thus, the block is split, and each half processed as its own block. The upper portion A3–B4 of the left half has a minimal variance except for small noise, and is compressed. Similarly, the lower portion A1–B2 is relatively uniform in value, and is assigned the closest value to its average value. This process proceeds throughout the original block until all sub blocks have either been compressed, or broken down into single pixels.

In the example, the original 64 pixel values in the block are reduced to 26 values, a theoretical compression ratio of 2.46.

The function, parameters, thresholds and values employed may be more complex than in the illustration. The size of the block (or sub-block) being analyzed may determine these values. For instance, a large block might require a more limiting threshold for compression, because of the perceptibility of small value changes between large blocks.

Other factors may include the resolution of the original source image, qualities of the capture device.

Other variations on the method are also contemplated. For instance, to avoid the concerns about cutting square blocks and sub-blocks in one direction or the other (potentially missing opportunities for compression without degradation), the analysis of each square block or sub block may be made both ways. A first difference is calculated between horizontally divided sub-blocks, a second difference is calculated between vertically divided sub-blocks, and the greater of the differences used to identify the preferred direction in which to make the division. This improves the prospects for sub-blocks to be compressible, as the differences tend to be isolated earlier in the process.

Another conceptual approach to achieve the same end is to divide each square into four quadrants, and to perform the calculation accordingly.

A variation on this quadrant approach is to engage in still other ways to divide a block or sub block (typically square, as a rectangular block efficiently divides along its length). One useful division of a square block is to divide it into one part formed by 3 quadrants in an L shape, and the other part formed by the fourth quadrant. This is efficient for image gradients that proceed diagonally. For instance, in FIG. 6, block E5–F6 was uncompressed, yet if subdivided into a single pixel sub-block F5 and triple pixel sub block E5-E6-F6, the larger sub block may qualify for compression. This may also have been achieved with the single quadrant selected to be pixel E6. This variation may be added as a feature to the above as another alternative means to seek the greatest difference between sub-blocks, in order to determine the preferred method of dividing. This would also suggest that the diagonal gradient seeking mode would be applied in both orientations, to identify either direction of diagonal gradient.

Another optional feature to optimize the process is to identify any original sized blocks that are represented by a single value (i.e. fully compressed), to seek any adjacent fully compressed blocks of the same or tolerably similar value, and to compress those blocks together to be represented by a single value. This is useful for images having large uniform expanses of common values.

While the above is discussed in terms of preferred and alternative embodiments, the invention is not intended to be so limited. For instance, the values, thresholds, functions, and parameters may be varied to suit particular applications. The compression concepts may be applied to non-image files where lossy methods are tolerated, such as compression of audio or video data. The size of a nominal 8-by-8 pixel block may be adjusted (preferably retaining the repeatedly-divisible 2'-by-2' format) to accommodate different needs, based on the expected typical size of a compressed sub block. This avoids needless processing of too-large initial blocks, or needless aggregating of too-small initial blocks.

What is claimed is:

1. A method of compressing a set of image data organized into a matrix of pixels each having a value, comprising:
   selecting a multi-pixel block portion of the data;
   performing a first selected mathematical function on the multi-pixel block portion to generate a first result;
   dividing the multi-pixel block portion into at least two sub-blocks;
   performing a second selected mathematical function on each of the sub-blocks to generate a second result and a third result; and
   based on a comparison of the first, second, and third results, determining the degree to which deviations in values of pixels in the multi-pixel block portion are due to noise and to image detail and determining whether or not to compress the multi-pixel block portion.

2. The method of claim 1 wherein the first selected mathematical function is operable to calculate a typical deviation value of pixels in the multi-pixel block portion.

3. The method of claim 1 wherein the multi-pixel block portion is a rectangle having an aspect ratio selected from the values 1 and 2, such that the multi-pixel block portion is a square or a rectangle formed of two squares.

4. The method of claim 1 wherein compression includes assigning each pixel in the multi-pixel block portion a common value.

5. The method of claim 1 wherein determining whether or not to compress the multi-pixel block portion includes compressing the multi-pixel block portion if deviations are due primarily to noise.

6. The method of claim 1 wherein determining whether or not to compress the multi-pixel block portion includes compressing the multi-pixel block portion if the deviation value is below a selected first limit, not compressing if the deviation is above a greater selected second limit, and if the deviation is between the first and second limits, compressing if the level of detail is less than a threshold function that declines as deviation increases.

7. A method of compressing a set of image data organized into a matrix of pixels each having a value, comprising:
   selecting a multi-pixel block portion of the data;
   performing a first selected mathematical function on the multi-pixel block portion to generate a first result;
   dividing the multi-pixel block portion into at least two sub-blocks;
   performing a second selected mathematical function on each of the sub-blocks to generate a second result and a third result; and
   based on a comparison of the first, second, and third results, determining whether or not to compress the multi-pixel block portion, including determining if the difference between the second and third results exceeds a predetermined threshold, and if so, analyzing each sub-block separately for a compression determination.

8. The method of claim 7 wherein the predetermined threshold is based on the first result.

9. The method of claim 8 wherein the predetermined threshold is a function that declines as the first result increases.

10. A method of compressing a set of image data organized into a matrix of pixels each having a value, comprising:
    selecting a multi-pixel block portion of the data;
    performing a first selected mathematical function on the multi-pixel block portion to generate a first result;
    dividing the multi-pixel block portion into at least two sub-blocks;
    performing a second selected mathematical function on each of the sub-blocks to generate a second result and a third result; and
    based on a comparison of the first, second, and third results, determining whether or not to compress the multi-pixel block portion including, if a determination is made not to compress the multi-pixel block portion, dividing the multi-pixel block portion is a different manner into at least two different sub-blocks to generate a fourth result and a fifth result, determining which step of dividing yields a greater difference of results, and basing the determination whether to compress on the greater difference.

11. The method of claim 10 including, if a determination is made not to compress the multi-pixel block portion, dividing the multi-pixel block portion into sub-blocks in the manner that yields the greater result difference, and analyzing each of the sub-blocks thus divided to determine whether it should be compressed or subdivided.

12. A method of compressing a set of image data organized into a matrix of pixels each having a value, comprising:
    selecting a multi-pixel block of the data;
    determining a typical variance value for at least some of the pixels in the multi-pixel block;
    determining a degree to which the variance value is attributable to noise and to image detail;
    if the variance is due to more than a selected degree of noise, compressing the multi-pixel block; and
    if the variance is due to more than a selected degree of image detail, dividing the multi-pixel block into sub blocks.

13. The method of claim 12 including recursively analyzing each sub block to determine whether to compress or divide the each sub block, until all sub blocks have been compressed or subdivided into individual pixels.

14. The method of claim 12 including, if a sub block includes multiple pixels, determining whether to compress or divide the sub block.

15. The method of claim 12 wherein determining a degree to which the variance value is attributable to noise and to image detail comprises dividing the multi-pixel block into two sections and for each section, determining a mean value for each section, and comparing the mean values.

16. The method of claim 15 including, if the difference between the compared mean values is greater than a preselected threshold, analyzing each section separately to determine whether to compress or to subdivide the section.

17. The method of claim 16 wherein the preselected threshold is a function based on the variance value of the multi-pixel block.

18. The method of claim 17 wherein the function yields compressing the multi-pixel block if the variance value is below a selected first threshold, not compressing if the deviation is above a selected second threshold, and if the deviation is between the first and second thresholds, compressing if the level of detail is less than a threshold function that declines as variance increases.

* * * * *